Figure 1:
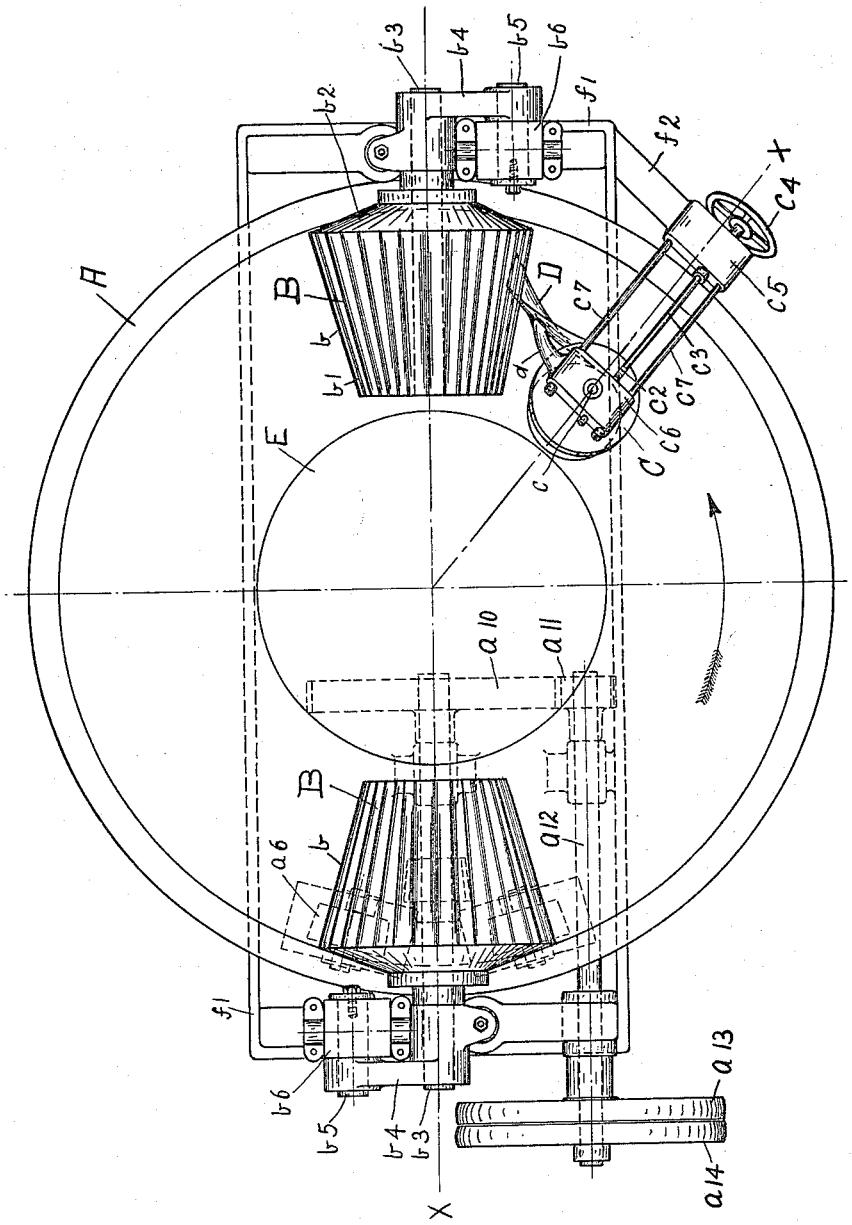

C. PLETSCHER.
ROTARY ROLLER PAN.
APPLICATION FILED APR. 19, 1915.

1,154,935.

Patented Sept. 28, 1915.
3 SHEETS—SHEET 1.

WITNESSES:

INVENTOR.

C. PLETSCHER.
ROTARY ROLLER PAN.
APPLICATION FILED APR. 19, 1915.

1,154,935.

Patented Sept. 28, 1915.
3 SHEETS—SHEET 3.

WITNESSES:
Louis Charles Reese,
Morris H. Johnston

INVENTOR.
Carl Pletscher

UNITED STATES PATENT OFFICE.

CARL PLETSCHER, OF SAGINAW, MICHIGAN, ASSIGNOR TO WERNER & PFLEIDERER COMPANY, OF SAGINAW, MICHIGAN.

ROTARY ROLLER-PAN.

1,154,935.

Specification of Letters Patent.

Patented Sept. 28, 1915.

Application filed April 19, 1915. Serial No. 22,452.

*To all whom it may concern:*

Be it known that I, CARL PLETSCHER, a citizen of the Republic of Switzerland, residing at Saginaw, county of Saginaw, and State of Michigan, have invented new and useful Improvements in Rotary Roller-Pans, of which the following is a specification.

This invention relates to improvements in rotary roller pans serving to most minutely crush, grind, mix and knead the different raw materials forming the ingredients of doughs, pastes and the like and has for its object to perform these operations more efficiently, quickly and safely. To this end, I use a rotary round pan, the working surface of which is inclined evenly toward the circumference of the pan. The latter is provided at its outer edge with a circular sidewall preferably vertical to the working surface which ends at its upper circumference in a narrow annular part arranged steeper than the same. The top of the pan is a circular plane and carries a mushroom-like cap, the side wall of which forms a prolongation of the annular upper part of the pan. Material dropped on the cap will slide down this annular upper part onto the working surface of the pan where it is crushed, ground, mixed and kneaded by means of corrugated cone-shaped rollers turning around a shaft fixed to the structure carrying the pan. The rollers are corrugated at their slant side, and the edges of their ribs are parallel to the working surface and extend nearly its whole length from the side wall to the upper end in the direction of the diameter of the pan. The shafts around which the rollers rotate, are preferably arranged horizontal and connected to the structure of the pan in a resilient manner in order to allow for differences in the thickness of the pastes or doughs worked. The material thus treated is turned over first by a curved reel turning loosely around a shaft arranged vertically to the working surface of the pan and fixed in an adjustable manner to a framework attached to the structure carrying the pan, and then by a small plow-like scraper fitting into the curved outline of the reel and fixed to the adjustable part of the framework carrying same. The material is then ready for treatment by the following roller.

The accompanying drawings showing the novel features and parts of the invention, represent by way of example a rotary roller pan constructed for mixing and kneading dough for macaroni.

Figure 2:
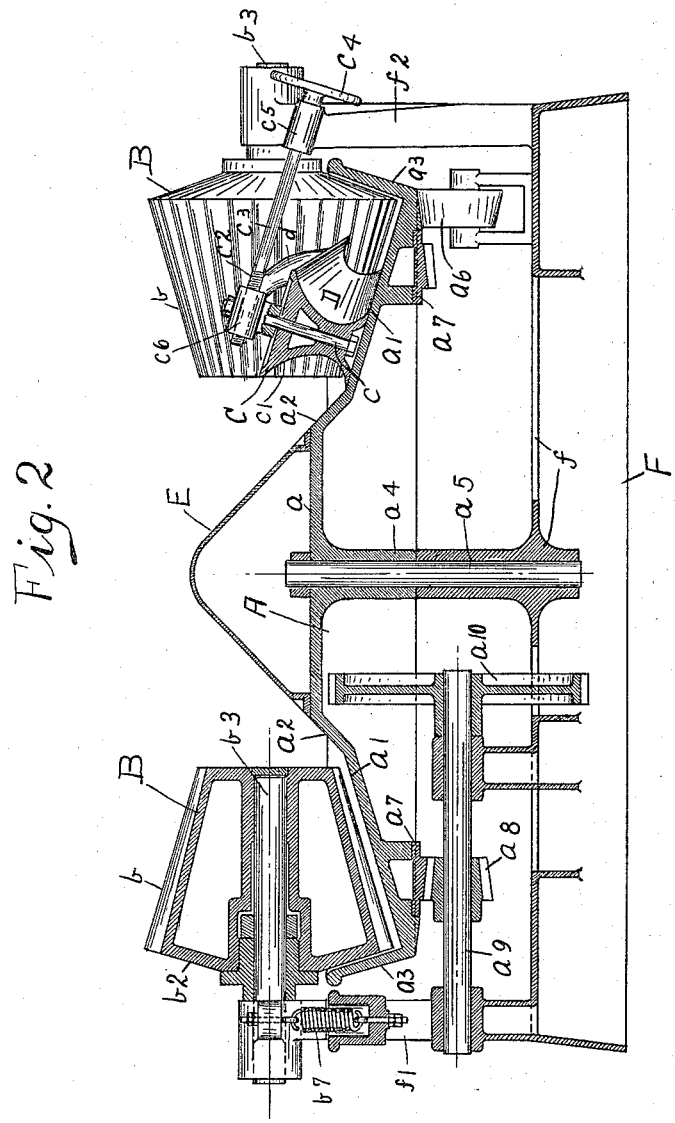
Figure 3:
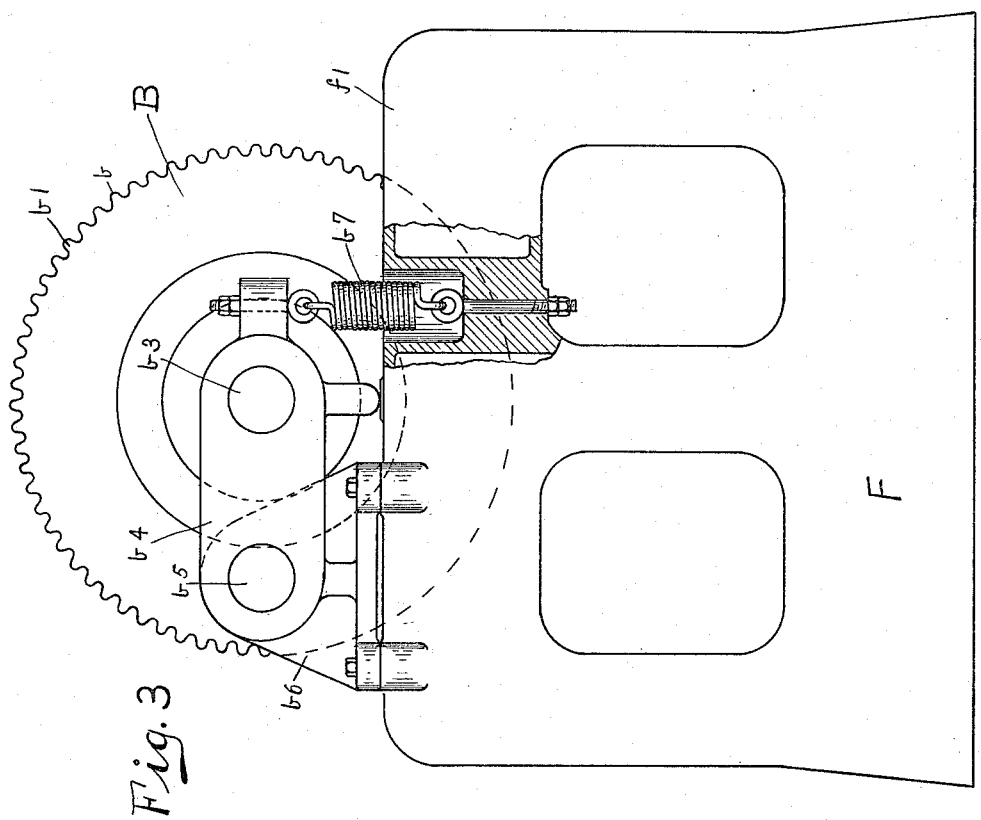

Figure 1 is a top view of the machine and Fig. 2 a sectional elevation on the lines X—X of Fig. 1. Fig. 3 shows the arrangement of the resilient roller shaft.

A represents the rotary pan in which the dough or the like is worked by the corrugated conical roller B and turned over by the reel C and the plow-like scraper D for treatment by a second roller B.

E is the mushroom-shaped top cover of A, and F the structure carrying A.

$a$ indicates the horizontal top of A, $a_1$ its inclined working surface and $a_2$ the inclined annular plane intermediate between the top $a$ and the working surface $a_1$ and somewhat steeper than the latter.

$a_2$ forms the continuation of the sidewall of the mushroom-shaped cover E. Thus, material dropped by a chute on E will slide down along the sidewall of E and $a_2$ onto the working surface $a_1$, while the pan is revolving and at work.

$a_3$ represents the circular sidewall which is vertical to the working surface $a_1$.

$a_4$ is the hollow leg arranged at the center of the top $a$ and thus of the pan A and fitting over the vertical shaft $a_5$ carried by the base $f$ of the structure F. The pan A is supported by the rotary rollers $a_6$ and revolves in the direction of the arrow by means of the toothed ring $a_7$ meshing with the gear wheel $a_8$ which is attached to the countershaft $a_9$ and driven by the gear wheel $a_{10}$ fixed thereto and meshing with the gear wheel $a_{11}$ arranged at the driving shaft $a_{12}$. This shaft is provided with the driving pulley $a_{13}$ and the loose pulley $a_{14}$ and is connected by belt (not shown) to the pulley of the power machine.

The working edge $b$ of the ribs $b_1$ of the corrugated roller B of which two are employed for a pan, is parallel to the working surface $a_1$. The base $b_2$ of the cone forming the roller is arranged as near as possible to the sidewall $a_3$ of the pan A. The rollers B are turned around the shafts $b_3$ by means of the dough sheet passing thereunder on the working surface $a_1$ of the revolving pan. The shaft $b_3$ is fixed to the lever $b_4$ which turns in its fulcrum around the pin $b_5$ fixed in the block $b_6$ which is attached to the sidewall $f_1$ of the structure F. The lever $b_4$ is held down by the spring $b_7$ fixed thereto and to $f_1$, to such a degree that the roller B is kept normally at its right working position. This arrangement gives the roller B a certain degree of resiliency which allows an abnormally large piece of dough pressing against the roller, slightly to lift the latter and thus prevents a disturbance of the working or damage to the machinery of the pan.

The loose reel C is turned around its shaft $c$ by means of the dough sheet passing thereby on the working surface $a_1$ of the pan. The sides of the reel are parallel to $a_1$, and the outline $c_1$ of the circular part which is vertical to $a_1$, is curved in such a way as to cause the dough sheet at least partly to turn over. The position of C on the working surface $a_1$ in regard to the side wall $a_3$ is regulated by means of the screw $c_2$ of the shaft $c_3$ provided with the handle $c_4$. The shaft $c_3$ turns in the stationary block $c_5$ fixed by the arm $f_2$ to the sidewall $f_1$ of F and connected by the rods $c_7$ to the movable block $c_6$ which carries the reel C and in which the screw $c_2$ works, the shaft $c$ being vertical to the sidewalls of C and the working surface $a_1$ and fixed to the movable block $c_6$. In this way, by working the screw, the reel C is moved backward or forward in regard to the sidewall of the pan A. The dough sheet leaving the reel C is then completely turned over by the plow-like scraper D arranged over $a_1$ behind C and fixed by the arm $d$ to the movable block $c_6$ also carrying C. The shape of D follows closely the curved outline of the reel C, and when the latter is moved by the screw $c_2$, the former moves with it. After passing the scraper D, the dough is ready for treatment by the following corrugated roller B. Therefore, no attendant need touch the dough while the pan is at work.

I claim:

1. In a rotary roller pan, the combination of a circular pan rotating around a vertical shaft and having a plain working surface slanting in straight line upward from the circumference toward the center of the pan with corrugated conical rollers working thereon and turning loosely around horizontal resilient axles, a loose reel turning vertically to the working surface of the pan and having the outline of its circular part so curved as to be adapted to turn over the material worked by the conical rollers, a shaft vertical to the working surface of the pan and around which the reel loosely turns, a plow-like scraper following in outline closely the curved outline of the reel, an arm carrying the shaft around which the reel turns, and the scraper, and fixed to the frame work of the machine, and appliances adapted to adjust the position of the reel and scraper in regard to the working surface of the pan and arranged at the arm carrying them.

2. In a rotary roller pan, the combination of a circular pan provided at its circumference with a vertical rim and having a plain inclined working surface slanting upward from the circumference to the center of the pan, a steeper annular part at the upper edge of the working surface and a flat circular top, with a mushroom-like cap covering the latter and forming a continuation of the annular part, means for rotating the pan, a vertical shaft around which it revolves, a tube fixed in the center of the top of the pan and holding it in position on the shaft, conical corrugated rollers working parallel to and extending nearly across the whole width of the working surface, horizontal resilient shafts arranged at the framework of the machine and around which the rollers loosely turn by means of the material passing beneath, curved loose reels for turning over the material worked by the rollers, shafts arranged vertical to the working surface and around which the reels are rotated by means of the material passing thereon, stationary plow-like scrapers the outline of which follows closely the curved outline of the reels, arms carrying the scrapers and the shafts holding the reels, and fixed to the framework of the machine, and appliances arranged at these arms and adapted to adjust simultaneously the position of the reels and of the scrapers in regard to the working surface.

CARL PLETSCHER.

Witnesses:
 LOUIS CHARLES REESE,
 MORRIS L. JOHNSTON.